United States Patent [19]

Banik, Jr.

[11] 4,225,622

[45] Sep. 30, 1980

[54] PROTEIN HYDROLYSIS PRODUCTS FROM LIMED SPLITS

[75] Inventor: Michael S. Banik, Jr., Chicago, Ill.

[73] Assignee: Inolex Corporation, Chicago, Ill.

[21] Appl. No.: 899,291

[22] Filed: Apr. 24, 1978

[51] Int. Cl.$^2$ ................................................ A23J 1/10
[52] U.S. Cl. .......................................... 426/32; 426/56; 426/657; 426/476; 426/511; 424/62; 424/70; 435/69
[58] Field of Search ................... 426/657, 576, 32, 56, 426/59, 511, 476; 424/62, 70; 195/71, 29, 212; 435/69

[56] References Cited

U.S. PATENT DOCUMENTS

| | | | |
|---|---|---|---|
| 3,308,113 | 3/1967 | Johnsen et al. | 426/570 |
| 3,683,939 | 8/1972 | Johnsen et al. | 424/71 |
| 3,738,913 | 6/1973 | Johnsen et al. | 424/71 |

Primary Examiner—Jeanette M. Hunter
Attorney, Agent, or Firm—Dressler, Goldsmith, Shore, Sutker & Milnamow, Ltd.

[57] ABSTRACT

Tannery limed splits are utilized as a collagen source to produce protein hydrolyzates, utilizing steam under superatmospheric pressure as a heat source and utilizing molecular sulfur dioxide to minimize color development.

2 Claims, No Drawings

PROTEIN HYDROLYSIS PRODUCTS FROM LIMED SPLITS

BACKGROUND OF THE INVENTION

This invention relates to the preparation of protein hydrolyzates, and particularly non-gelling protein hydrolyzates, from tannery limed splits.

In the preparation of non-gelling protein hydrolyzates or protein hydrolyzates of zero bloom strength from collagenous material, it is known to heat the collagenous material in a cook tank in the presence of sulfite ions to minimize the development of color. Such processes are disclosed, for example, in U.S. Pat. No. 3,308,113, granted Mar. 7, 1967; U.S. Pat. No. 3,683,939, granted Aug. 15, 1972 and U.S. Pat. No. 3,738,913, granted June 12, 1973, all in the names of Vernon L. Johnsen, Eugene V. Matern and Raymond S. Burnett.

The collagenous material which may be used in such processes includes materials from such sources as bones, skins, hides, sinews, fatty tissues and the like.

The sulfite ion source is generally calcium bisulfite, separately prepared by passing liquid sulfur dioxide into a slurry of calcium carbonate until the solution becomes clear. Sulfur dioxide is disclosed as a possibly advantageous source of sulfite ions in that its addition does not introduce ash forming constituents (e.g. at col. 2, lines 56 to 72 of U.S. Pat. No. 3,308,113), but its use is restricted to "jacketed pressure vessels that are not heated by direct steam." For vented vessels, the patentees disclose sulfite salts "because of their greater stability under the conditions of the pressure cooking," and because the "use of sulfur dioxide gas is uneconomical [in such vessels] due to loss in the continuously vented gases." In addition, the continuous venting of sulfur dioxide could constitute a health and safety hazard.

In the processing of hides for leather preparation, the hides, removed from slaughtered animals, are first soaked in brine, then dried for preservation before being shipped to a tannery.

The tanner first washes out the salt from the hides and then tumbles the hides in a lime (calcium hydroxide) bath containing sodium sulfide to totally remove hair from the hides. During this process, the hides absorb about 2% to 3% by weight of lime (calculated as calcium oxide).

The hides are then split in thickness to an outer thickness which makes the best leather, and an inner thickness which makes a poorer leather. The hides are split in such a way as to obtain a maximum area of the more desirable outer thickness; and the inner thickness is therefore frequently uneven, particularly at its edges. The edges are usually trimmed away before the split hides are tanned because tanning chemicals are expensive and there is no desire to waste them on trimmings which are not suitable for leather. The trimmings from hides after lime treatment, and particularly the trimmings from the inner thickness of the hides, are called "limed splits" at the tannery; and it is this material which is used as a collagen source in this invention.

Tannery limed splits have been used as a source of collagen in the preparation of gelatin and glue; and more recently have been used in the preparation of protein hydrolyzates of zero bloom strength in a vented cook tank utilizing live steam as a heat source. In the latter case, sulfite ions were charged to the cook tank in the form of a preformed calcium bisulfite solution; and there was no conception that molecular sulfur dioxide could be charged to a vented cook tank with substantially no losses where the collagenous material was limed splits.

BRIEF SUMMARY OF THE INVENTION

In accordance with the present invention hydrolyzed proteins are prepared by charging water, tannery limed splits and molecular sulfur dioxide into a cook tank, and continuously charging live steam to said cook tank while venting said cook tank under throttle to maintain a superatmospheric pressure and an elevated temperature therein.

Preferably, the molecular sulfur dioxide and water are charged together to the cook tank as an aqueous solution of sulfur dioxide prepared in a separate solubilizing tank. However, gaseous sulfur dioxide may, if desired, be charged directly to the cook tank.

Typically, the solubilizing tank is a small vessel in comparison to the cook tank and aqueous sulfur dioxide solution is continuously made therein and continuously charged to the cook tank until the latter is fully charged.

To prepare and charge an aqueous sulfur dioxide solution at a weight concentration between about 0.5% and about 5%, sulfur dioxide and cold water are separately charged to the solubilizing tank as continuous streams in the desired weight proportions and the sulfur dioxide solution is continuously withdrawn from the solubilizing tank as it is produced.

After the limed splits are charged to the cook tank, the aqueous sulfur dioxide solution is charged from the solubilizing tank until it covers the level of the limed splits. The cook tank is then closed and live steam is passed into the cook tank and vented at a rate to maintain a pressure therein between about 40 and about 50 pounds per square inch gauge.

After sufficient time to effect the desired hydrolysis (about 1½ to 3 hours) the cook tank is fully vented to zero gauge pressure; and the mixture in the tank is allowed to settle. The melted fat is drawn off; and the remaining liquid is separated from the insoluble residue by decantation.

The separated liquid is then concentrated from a solids content of about 10% to about 50% solids. It is then preferably subjected to enzyme hydrolysis with papain and finally treated with hydrogen peroxide to destroy residual sulfites in the solution.

EXAMPLE 1

A solubilizing tank of 250 gallon capacity was filled with cold water. Sulfur dioxide gas was introduced into the bottom of the tank at a rate of about two pounds per minute with good stirring. Cold water was introduced at a rate of about 25 gallons per minute while an aqueous sulfur dioxide solution was withdrawn at the same rate.

The withdrawn sulfur dioxide solution was passed into a cook tank already charged with about 20,000 pounds of hashed limed splits. After about 100 minutes (and a flow of 200 pounds of sulfur dioxide into the cook tank), the level of the liquid in the cook tank covered the limed splits and the flow of sulfur dioxide solution into the tank was ended.

The cook tank was then closed and live steam was introduced with controlled venting to maintain a pressure of about 42 pounds gauge for two hours.

The cook tank was then vented to zero gauge pressure and the mixture in the tank was allowed to settle.

The melted fat was drawn off and the liquid phase was decanted from the insoluble residue.

The liquid phase (at 10% solids concentration) was concentrated to 50% solids concentration in a two-stage evaporator.

The temperature of the 50% solids concentrate was adjusted to 150° F. and 8 pounds of papain was then mixed with the solution and allowed to digest the mixture for two hours. The papain enzyme was then irreversibly deactivated by heating the mixture to 190° F.

The digested material was then diluted to 45% solids and passed through a precoated filter to produce a clear filtrate. After further dilution to 42% solids, 20 pounds of 35% hydrogen peroxide was added to the liquid to destroy the sulfites.

The solution was then cooled to 120° F. and 0.3% formalin (37% formaldehyde solution) was then added as a preservative.

In two runs, the products were tested for Lovibund color values; and the results are shown in the Table below.

EXAMPLE 2 (PRIOR ART)

115 pounds of lime (calcium hydroxide) was added to 250 gallons of cold water and the mixture was slurried to produce an opaque suspension. Gaseous sulfur dioxide was passed into the slurry until the liquid became water clear, indicating complete conversion of the calcium hydroxide to calcium bisulfite, containing the equivalent of 200 pounds of sulfur dioxide.

The calcium bisulfite solution was added to a charge of 20,000 pounds of hashed limed splits covered with cold water in a cook tank.

The cook tank was then closed; and the charge was then treated in the same manner as described in Example 1, beginning with the introduction of live steam. The products of two runs were tested for Lovibund color values; and the results are shown in the Table below.

TABLE

| | Color of Finished Product | | | |
|---|---|---|---|---|
| Lovibund Color | Example 1 - $SO_2$ Method | | Example 2 - $Ca(HSO_3)_2$ Method | |
| 1% Solution | Run #1 | Run #2 | Run #3 | Run #4 |
| Yellow | 2.0 | 2.2 | 8.0 | 8.0 |
| Red | 0.6 | 0.6 | 2.1 | 2.0 |

As may be seen from the foregoing data, hydrolysis in a system utilizing molecular sulfur dioxide produces a product of substantially lighter color than hydrolysis in a system utilizing preformed calcium bisulfite.

The steam hydrolysis in accordance with the preferred aspect of this invention is carried out to the extent that the hydrolyzed product is one of zero bloom strength. Typically, the steam hydrolysis products has a Formol Nitrogen value from about 6% to about 9%; and the enzyme hydrolysis raises the Formol Nitrogen value by about 2% to the range from about 8% to about 11%.

The product made by the method of this invention is useful for incorporation into food, cosmetic and pharmaceutical products and is particularly useful in applications in which dark colors would be detrimental.

Although the invention has been described with respect to its preferred embodiments, it is to be understood that the description is illustrative, rather than restrictive, and that details may be modified without departing from the scope of the invention.

I claim:

1. A method for preparing hydrolyzed proteins comprising charging water, molecular sulfur dioxide, and tannery limed splits into a cook tank, the sulfur dioxide comprising from about 0.5% to about 5% of the weight of the charged water, continuously charging live steam to said cook tank for a period from about 1½ to about 3 hours and until said limed splits are converted to a steam hydrolysis product having a Formol Nitrogen value from about 6% to about 9%, while venting said cook tank under throttle to maintain a superatmospheric pressure and an elevated temperature therein, the superatmospheric pressure being between about 40 and about 50 pounds per square inch gauge, and thereafter venting and cooling said charge mixture.

2. The method of claim 1 wherein said vented and cooled charge mixture is then subjected to enzyme hydrolysis.

* * * * *